(12) United States Patent
Srnec et al.

(10) Patent No.: US 11,214,118 B2
(45) Date of Patent: Jan. 4, 2022

(54) DEMAND-SIDE POWER DISTRIBUTION MANAGEMENT FOR A PLURALITY OF TRANSPORT CLIMATE CONTROL SYSTEMS

(71) Applicant: THERMO KING CORPORATION, Minneapolis, MN (US)

(72) Inventors: Matthew Srnec, Minnetonka, MN (US); Philip Lewis Lavrich, Mooresville, NC (US); Eckardt Augenstein, Essen (DE); Matthias Gorski, Bochum (DE); Ryan Wayne Schumacher, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 170 days.

(21) Appl. No.: 16/565,252

(22) Filed: Sep. 9, 2019

(65) Prior Publication Data
US 2021/0070140 A1 Mar. 11, 2021

(51) Int. Cl.
*B60H 1/00* (2006.01)
*B60H 1/32* (2006.01)
(Continued)

(52) U.S. Cl.
CPC ..... *B60H 1/00428* (2013.01); *B60H 1/00014* (2013.01); *B60H 1/00735* (2013.01);
(Continued)

(58) Field of Classification Search
CPC ............ B60H 1/00428; B60H 1/00014; B60H 1/00735; B60H 1/00764; B60H 1/00878;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Nelson J Nieves
(74) *Attorney, Agent, or Firm* — Hamre, Schumann, Mueller & Larson, P.C.

(57) ABSTRACT

A method of power demand management is provided. The method includes an electrically powered climate control unit (CCU) detecting one or more additional electrically powered CCUs in a vicinity of the electrically powered CCU and the CCU establishing a communication link with the one or more additional electrically powered CCUs. The method includes generating and transmitting a pending power request to demand power from the power source to the CCU. The CCU monitors for one or more additional pending power requests from the one or more additional CCUs and monitors its position within a power request queue for obtaining power from the power source amongst the CCU and the one or more additional CCUs. Also, the method includes the electrically powered CCU demanding power from the power source when its position within the power request queue is high enough to demand power from the power source.

12 Claims, 8 Drawing Sheets

(51) Int. Cl.
*B60P 3/20* (2006.01)
*B60R 16/03* (2006.01)
*H04W 4/80* (2018.01)
*H04W 76/10* (2018.01)

(52) U.S. Cl.
CPC ..... *B60H 1/00764* (2013.01); *B60H 1/00878* (2013.01); *B60H 1/00978* (2013.01); *B60H 1/3208* (2013.01); *B60H 1/3232* (2013.01); *B60P 3/20* (2013.01); *B60R 16/03* (2013.01); *H04W 4/80* (2018.02); *H04W 76/10* (2018.02)

(58) Field of Classification Search
CPC . B60H 1/00978; B60H 1/3208; B60H 1/3232
See application file for complete search history.

(56) References Cited

U.S. PATENT DOCUMENTS

| | | |
|---|---|---|
| 5,231,849 A | 8/1993 | Rosenblatt |
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,652,330 B1 | 11/2003 | Wasilewski |
| 6,688,125 B2 | 2/2004 | Okamoto et al. |
| 6,753,692 B2 | 6/2004 | Toyomura et al. |
| 6,925,826 B2 | 8/2005 | Hille et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,134,339 B2 | 3/2012 | Burlak et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabec |
| 8,476,872 B2 | 7/2013 | Truckenbrod et al. |
| 8,487,458 B2 | 7/2013 | Steele et al. |
| 8,541,905 B2 | 9/2013 | Brabec |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,742,620 B1 | 6/2014 | Brennan et al. |
| 8,760,115 B2 | 6/2014 | Kinser et al. |
| 8,764,469 B2 | 7/2014 | Lamb |
| 8,767,379 B2 | 7/2014 | Whitaker |
| 8,818,588 B2 | 8/2014 | Ambrosio et al. |
| 8,862,356 B2 | 10/2014 | Miller |
| 8,912,683 B2 | 12/2014 | Dames et al. |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabec |
| 9,147,335 B2 | 9/2015 | Raghunathan et al. |
| 9,199,543 B2 | 12/2015 | Brabec |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabec |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2003/0201097 A1 | 10/2003 | Zeigler et al. |
| 2005/0057210 A1 | 3/2005 | Ueda et al. |
| 2005/0065684 A1 | 3/2005 | Larson et al. |
| 2006/0284601 A1 | 12/2006 | Salasoo et al. |
| 2007/0052241 A1 | 3/2007 | Pacy |
| 2007/0192116 A1 | 8/2007 | Levitt |
| 2008/0177678 A1 | 7/2008 | Di Martini et al. |
| 2008/0281473 A1 | 11/2008 | Pitt |
| 2009/0121798 A1 | 5/2009 | Levinson |
| 2009/0122901 A1 | 5/2009 | Choi et al. |
| 2009/0126901 A1 | 5/2009 | Hegar et al. |
| 2009/0178424 A1 | 7/2009 | Hwang et al. |
| 2009/0195349 A1 | 8/2009 | Frader-Thompson et al. |
| 2009/0228155 A1 | 9/2009 | Slifkin et al. |
| 2009/0314019 A1 | 12/2009 | Fujimoto et al. |
| 2009/0320515 A1 | 12/2009 | Bischofberger et al. |
| 2010/0045105 A1 | 2/2010 | Bovio et al. |
| 2010/0089669 A1* | 4/2010 | Taguchi ............ B60H 1/00278 180/65.1 |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0118916 A1 | 5/2011 | Gullichsen |
| 2011/0162395 A1 | 7/2011 | Chakiachvili et al. |
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2011/0290893 A1 | 12/2011 | Steinberg |
| 2012/0000212 A1 | 1/2012 | Sanders et al. |
| 2012/0116931 A1 | 5/2012 | Meyers |
| 2012/0153722 A1 | 6/2012 | Nazarian |
| 2012/0198866 A1 | 8/2012 | Zeidner |
| 2012/0310376 A1 | 12/2012 | Krumm et al. |
| 2012/0310416 A1 | 12/2012 | Tepper et al. |
| 2013/0000342 A1 | 1/2013 | Blasko et al. |
| 2013/0073094 A1 | 3/2013 | Knapton et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2014/0343741 A1 | 11/2014 | Clarke |

(56) References Cited

U.S. PATENT DOCUMENTS

| | | |
|---|---|---|
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0306937 A1 | 10/2015 | Kitamura et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283536 A1* | 9/2019 | Suzuki ................. B60H 1/3232 |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0130645 A1* | 4/2020 | Srnec ..................... B60Q 9/00 |
| 2020/0136504 A1 | 4/2020 | Schumacher et al. |
| 2020/0207184 A1 | 7/2020 | Schumacher et al. |
| 2020/0231041 A1* | 7/2020 | Lavrich ................ F25B 27/00 |
| 2021/0061156 A1* | 3/2021 | Swab ................ B60H 1/00428 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2018-136090 | 8/2018 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | WO-2014002244 A1 * | 1/2014 | ............ H02J 7/0068 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |

(56) References Cited

FOREIGN PATENT DOCUMENTS

| WO | 2020068646 | 4/2020 |
|---|---|---|
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution to Transport Climate Control Systems Amongst One or More Electric Supply Equipment Stations", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,282, titled "Optimized Power Cord for Transferring Power to a Transport Climate Control System", filed Sep. 9, 2019, 43 pages.

U.S. Appl. No. 16/565,235, titled "Interface System for Connecting a Vehicle and a Transport Climate Control System", filed Sep. 9, 2019, 64 pages.

U.S. Appl. No. 16/565,205, titled "Transport Climate Control System With an Accessory Power Distribution Unit for Managing Transport Climate Control Loads", filed Sep. 9, 2019, 57 pages.

U.S. Appl. No. 17/015,190, titled "Optimized Power Distribution to Transport Climate Control Systems Amongst One or More Electric Supply Equipment Stations", filed Sep. 9, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/730,126, titled "Transport Climate Control System Power Architecture", filed Dec. 30, 2019, 27 pages.

U.S. Appl. No. 17/015,194, titled "Prioritized Power Delivery for Facilitating Transport Climate Control", filed Sep. 9, 2020, 41 pages.

Extended European Search Report, issued in the corresponding European patent application No. 20195234.8, dated Jan. 29, 2021, 10 pages.

* cited by examiner

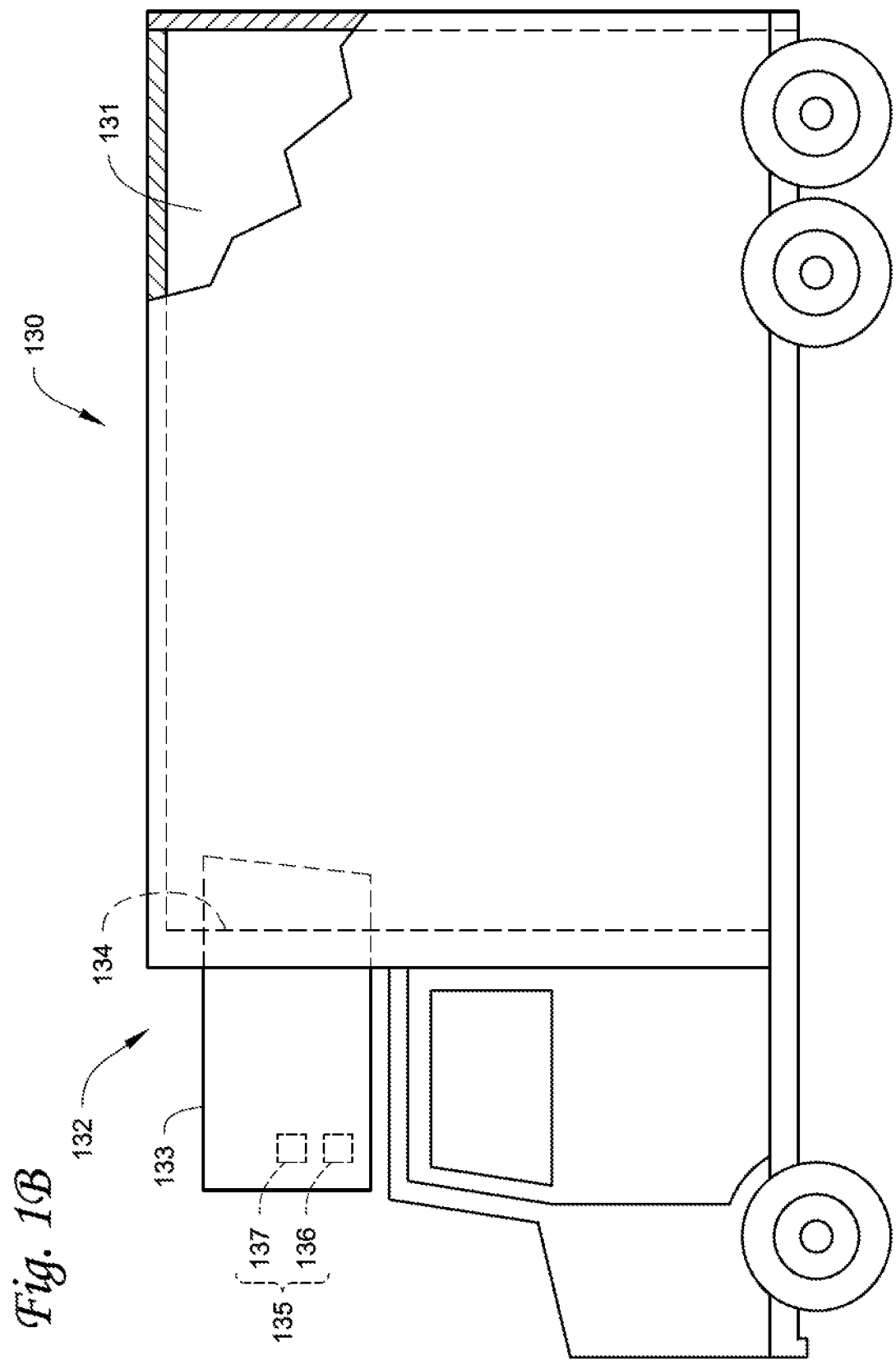

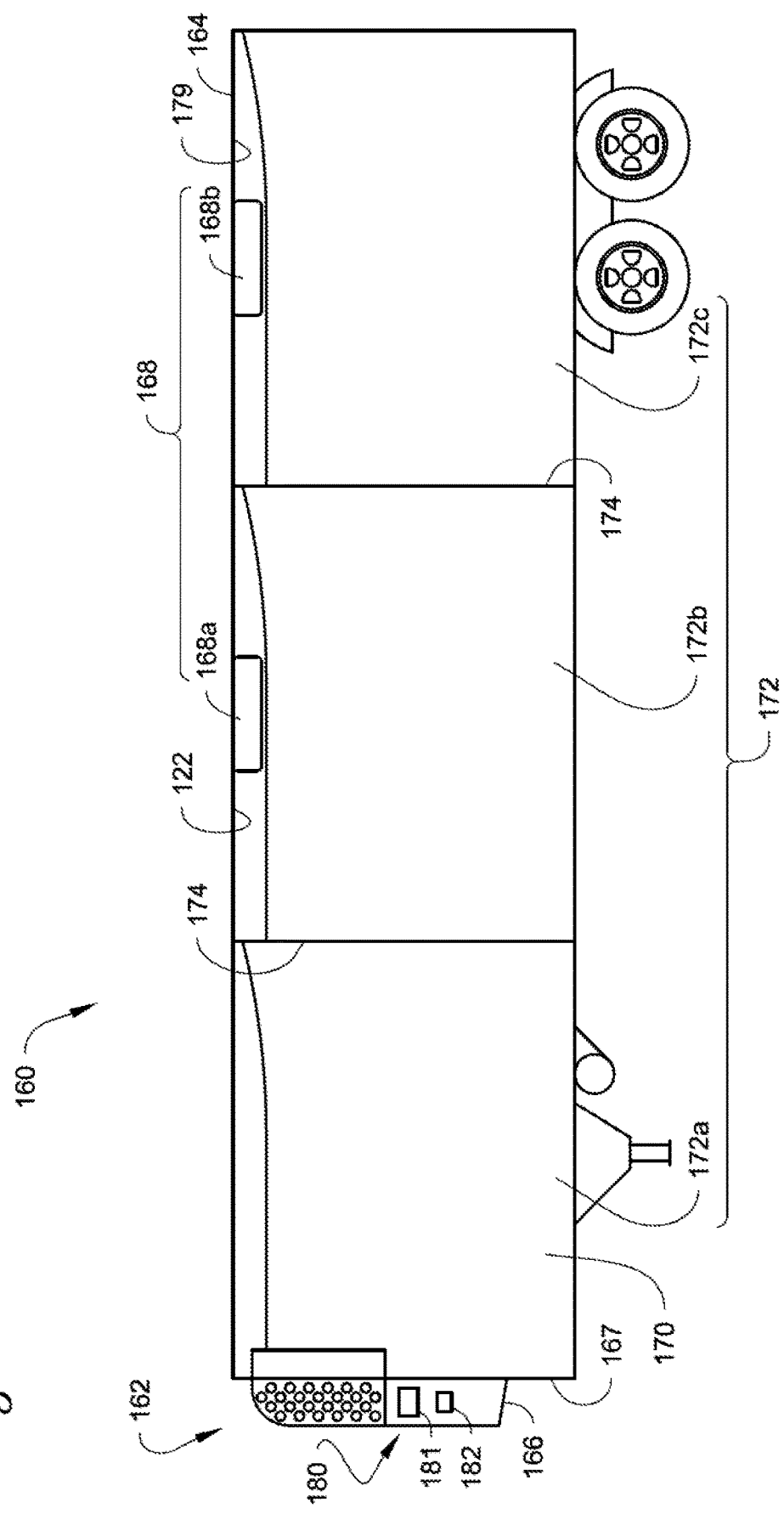

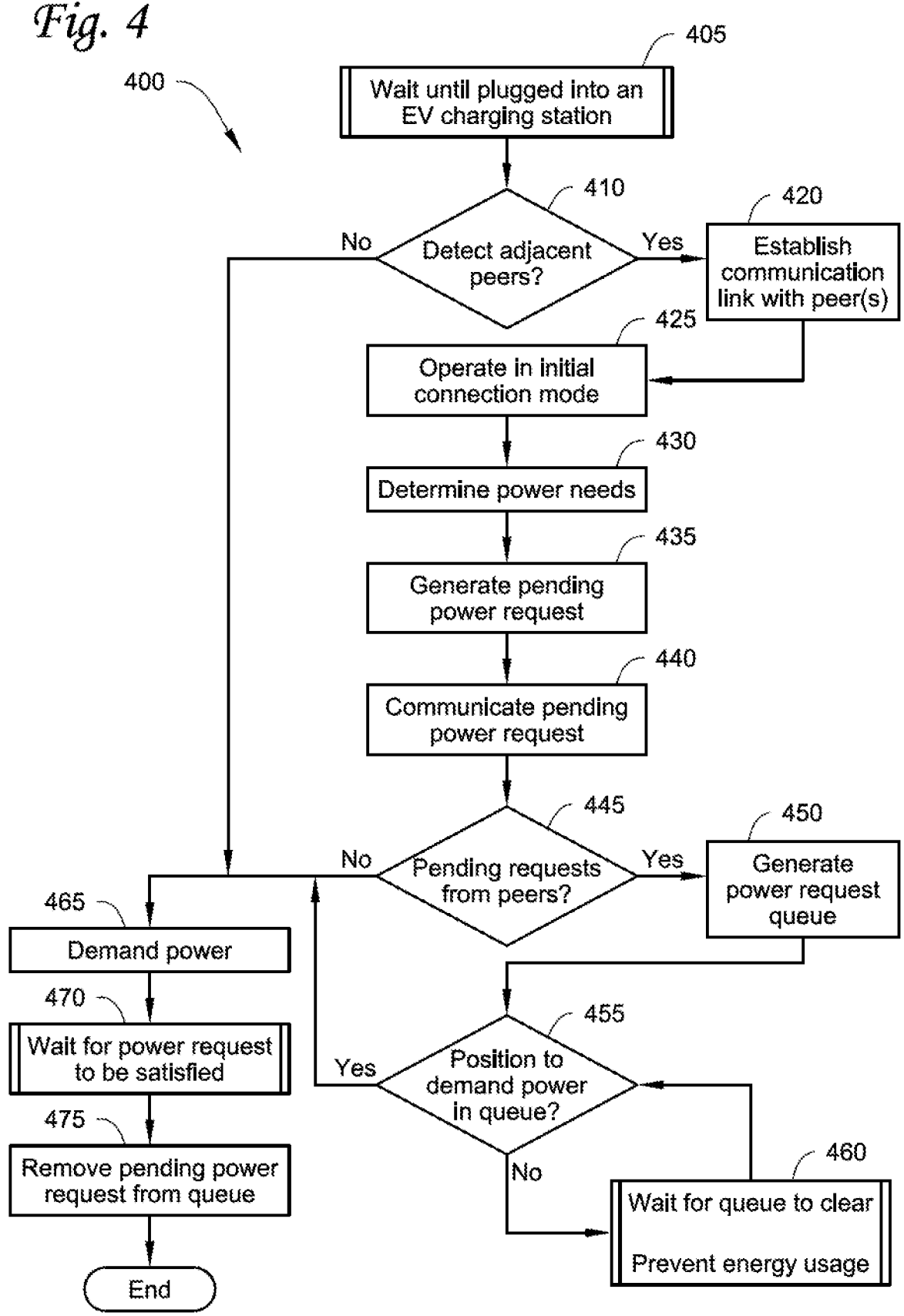

DEMAND-SIDE POWER DISTRIBUTION MANAGEMENT FOR A PLURALITY OF TRANSPORT CLIMATE CONTROL SYSTEMS

FIELD

The disclosure herein relates to an electrically powered accessory configured to be used with at least one of a vehicle, a trailer, and a transport container. More particularly, the disclosure herein relates to demand-side power distribution for a plurality of electrically powered accessories.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

The embodiments disclosed herein relate to an electrically powered accessory configured to be used with at least one of a vehicle, trailer, and a transport container. More particularly, the embodiments disclosed herein relate to demand-side power distribution management for a plurality of electrically powered accessories.

In particular, the embodiments described herein allow multiple electrically powered accessories receiving power at the same power distribution site to manage power distribution from the power source(s) at the power distribution site. In some embodiments, the accessories can manage power distribution with limited input (e.g., distribution site power limits, peak demand charge threshold, etc.) from the supply side (e.g., the power distribution site). The accessories can demand power from the distribution site in order to operate while at the power distribution site and/or to charge a rechargeable energy storage for later use by the accessory, for example, while in transit.

In some embodiments, an accessory can determine whether other accessories are at the same power distribution site, can monitor operation modes of the other accessories, and can determine when to demand power from the power distribution site based on this information. Accordingly, the accessories can coordinate their starting, running, and charging to manage power supplied by the power distribution site using peer-peer communication.

An advantage of these embodiments is that performance of the power distribution site can be improved without creating security and/or interoperability issues.

In one embodiment, a method of power demand management is provided. The method includes an electrically powered accessory configured to be used with at least one of a vehicle, a trailer, and a transportation container sensing that it has connected to a power source. The method also includes the electrically powered accessory detecting one or more additional electrically powered accessories in a vicinity of the electrically powered accessory. Also, the method includes the electrically powered accessory establishing a communication link with the one or more additional electrically powered accessories. Further, the method includes the electrically powered accessory generating a pending power request to demand power from the power source to the electrically powered accessory when the electrically powered accessory detects one or more additional electrically powered accessories in the vicinity of the electrically powered accessory. Further, the method includes the electrically powered accessory transmitting the pending power request to the one or more additional electrically powered accessories. Additionally, the method includes the electrically powered accessory monitoring for one or more additional pending power requests from the one or more additional electrically powered accessories. The method also includes the electrically powered accessory monitoring its position within a power request queue for obtaining power from the power source amongst the electrically powered accessory and the one or more additional electrically powered accessories. Also, the method includes the electrically powered accessory demanding power from the power source when its position within the power request queue is high enough to demand power from the power source.

In another embodiment, an electrically powered accessory is provided. The electrically powered accessory includes a controller, a wireless communicator, and a rechargeable energy storage. The controller controls operation of the electrically powered accessory and senses when the electrically powered accessory is connected to a power source. The wireless communicator includes short distance wireless peer to peer communication for short distance peer to peer communication, wherein the wireless communicator is configured to detect one or more additional electrically powered accessories in a vicinity of the electrically powered accessory and is configured to establish a communication link with the one or more additional electrically powered accessories. The rechargeable energy storage is configured to be charged by a power source and provides energy to the electrically powered accessory while in transit. The electrically powered accessory is configured to be used with at least one of a vehicle, a trailer, and a transportation container. The controller is configured to generate a pending power request to demand power from the power source to the electrically powered accessory when wireless communicator detects the one or more additional electrically powered accessories in the vicinity of the electrically powered accessory. The wireless communicator is configured to transmit the pending power request to the one or more additional electrically powered accessories. The wireless communicator is configured to monitor for one or more additional pending power requests from the one or more additional electrically powered accessories. The controller is configured to monitor a position of the electrically powered accessory within a power request queue for obtaining power from the power source amongst the electrically powered accessory and the one or more additional electrically powered accessories and is configured to demand power from the power source when the position of the electrically powered accessory within the power request queue is high enough to demand power from the power source.

In a further embodiment, a method of power demand management is provided. The method includes an electrically powered climate control unit (CCU) configured to be used with at least one of a vehicle, a trailer, and a transportation container sensing that it has connected to a power source. The method also includes the electrically powered CCU detecting one or more additional electrically powered CCUs in a vicinity of the electrically powered CCU. Also, the method includes the electrically powered CCU establishing a communication link with the one or more additional electrically powered CCUs. Further, the method includes the electrically CCU generating a pending power request to demand power from the power source to the electrically powered CCU when the electrically powered CCU detects one or more additional electrically powered CCUs in the vicinity of the electrically powered CCU. Moreover, the method includes the electrically powered CCU transmitting the pending power request to the one or more additional electrically powered CCUs. Additionally, the method includes the electrically powered CCU monitoring for one or more additional pending power requests from the one or more additional electrically powered CCUs. The method also includes the electrically powered CCU monitoring its position within a power request queue for obtaining power from the power source amongst the electrically powered CCU and the one or more additional electrically powered CCUs. Also, the method includes the electrically powered CCU demanding power from the power source when its position within the power request queue is high enough to demand power from the power source.

In yet another embodiment, an electrically powered climate control unit (CCU) is provided. The CCU includes a climate control circuit, a controller, a wireless communicator and a rechargeable energy storage. The climate control circuit is configured to provide climate control within a climate controlled space while in transit. The controller controls operation of the electrically powered CCU and senses when the electrically powered CCU is connected to a power source. The wireless communicator includes short distance wireless peer to peer communication for short distance peer to peer communication. The wireless communicator is configured to detect one or more additional electrically powered CCUs in a vicinity of the electrically powered CCU and is configured to establish a communication link with the one or more additional electrically powered CCUs. The rechargeable energy storage is configured to be charged by a power source and provides energy to the electrically powered CCU while in transit. The electrically powered CCU is configured to be used with at least one of a vehicle, a trailer, and a transportation container. Also, the controller is configured to generate a pending power request to demand power from the power source to the electrically powered CCU when wireless communicator detects the one or more additional electrically powered CCUs in the vicinity of the electrically powered CCU. Further, the wireless communicator is configured to transmit the pending power request to the one or more additional electrically powered CCUs. The wireless communicator is configured to monitor for one or more additional pending power requests from the one or more additional electrically powered CCUs. Also, the controller is configured to monitor a position of the electrically powered CCU within a power request queue for obtaining power from the power source amongst the electrically powered CCU and the one or more additional electrically powered CCUs and is configured to demand power from the power source when the position of the electrically powered CCU within the power request queue is high enough to demand power from the power source.

Other features and aspects will become apparent by consideration of the following detailed description and accompanying drawings.

BRIEF DESCRIPTION OF THE DRAWINGS

FIG. 1B illustrates a side view of a truck with a transport climate control system, according to one embodiment.

FIG. 1D illustrates a side view of a climate controlled transport unit with a multi-zone transport climate control system, according to one embodiment.

FIG. 4 illustrates a flowchart of a method for demand-side power distribution management amongst multiple electrically powered accessories, according to one embodiment.

Like reference numbers represent like parts throughout.

DETAILED DESCRIPTION

Figure 1A:
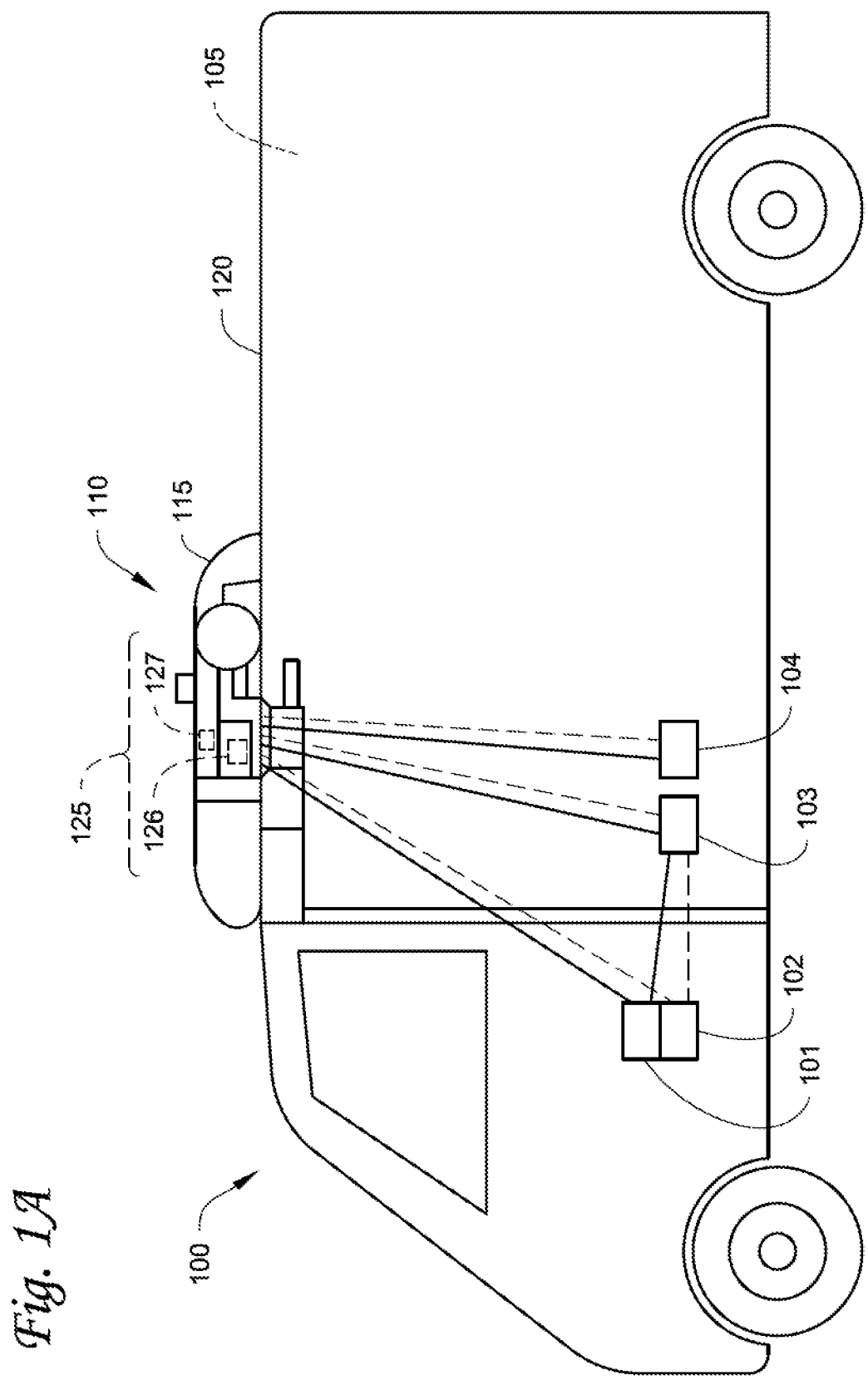
FIG. 1A illustrates a side view of a van with a transport climate control system, according to one embodiment.

The embodiments disclosed herein relate to an electrically powered accessory configured to be used with at least one of a vehicle, trailer, and a transport container. More particularly, the embodiments disclosed herein relate to demand-side power distribution management for a plurality of electrically powered accessories.

In particular, the embodiments described herein allow multiple electrically powered accessories receiving power at the same power distribution site to manage power distribution from the power source(s) at the power distribution site. In some embodiments, the accessories can manage power distribution with limited input (e.g., distribution site power limits, peak demand charge threshold, etc.) from the supply side (e.g., the power distribution site). The accessories can demand power from the distribution site in order to operate while at the power distribution site and/or to charge a rechargeable energy storage for later use by the accessory, for example, while in transit.

In some embodiments, an accessory can determine whether other accessories are at the same power distribution site, can monitor operation modes of the other accessories, and can determine when to demand power from the power distribution site based on this information. Accordingly, the accessories can coordinate their starting, running, and charging to manage power supplied by the power distribution site using peer-peer communication.

An advantage of these embodiments is that performance of the power distribution site can be improved without creating security and/or interoperability issues.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYS- TEM,"; U.S. application Ser. No. 16/565,110, "TRANSPORT CLIMATE CONTROL SYSTEM WITH A SELF-CONFIGURING MATRIX POWER CONVERTER,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORITIZED POWER DELIVERY FOR FACILITATING TRANSPORT CLIMATE CONTROL,"; U.S. application Ser. No. 16/565,205 "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565,235, "AN INTERFACE SYSTEM FOR CONNECTING A VEHICLE AND A TRANSPORT CLIMATE CONTROL SYSTEM,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

The climate-controlled van 100 can also include a vehicle PDU 101, a VES 102, a standard charging port 103, and/or an enhanced charging port 104. The VES 102 can include a controller (not shown). The vehicle PDU 101 can include a controller (not shown). In one embodiment, the vehicle PDU controller can be a part of the VES controller or vice versa. In one embodiment, power can be distributed from e.g., an electric vehicle supply equipment (EVSE, not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
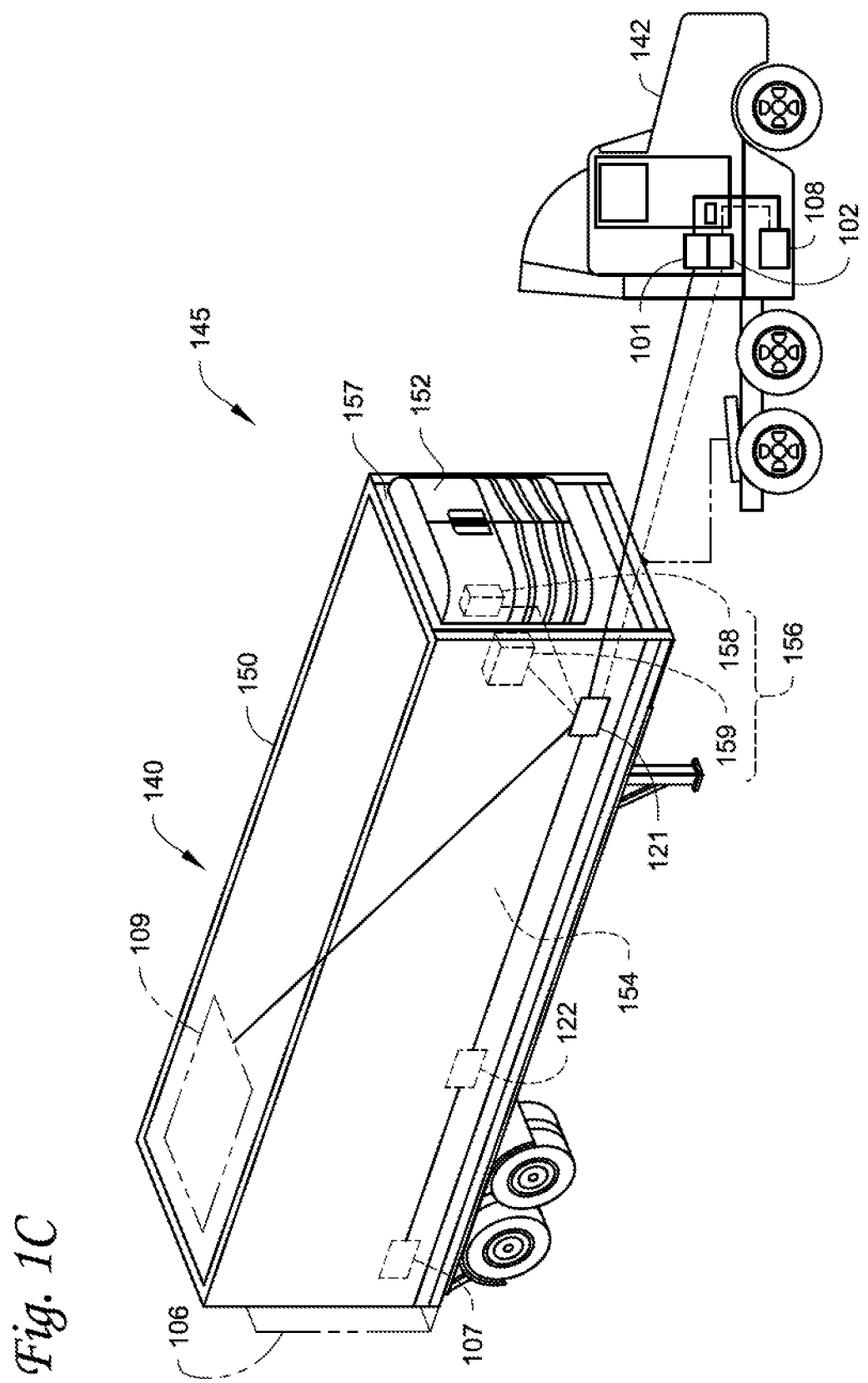
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
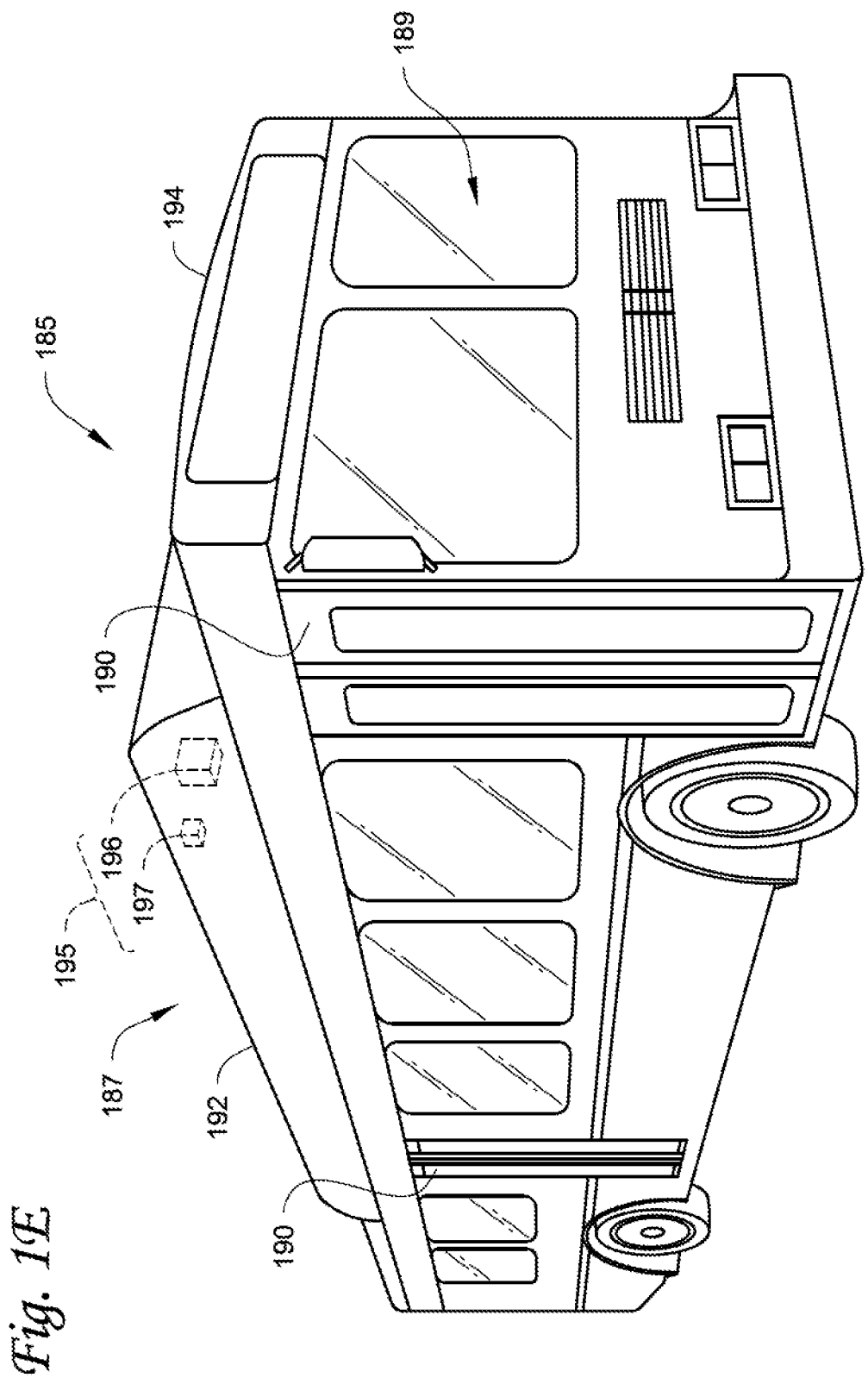
FIG. 1E illustrates a perspective view of a passenger vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

In some embodiments, a CCU (e.g., the CCU 115, 133, 152, 166, 170) can be an electrically powered climate control unit. Also, in some embodiments, the CCU can include a rechargeable energy storage (not shown) that can provide power to a transport climate control system (e.g., the transport climate control systems 110, 132, 145, 162, 187). In some embodiments, the rechargeable energy storage can be charged by Alternating Current ("AC") power (e.g., three-phase AC power, single phase AC power, etc.) and/or by Direct Current ("DC") power.

Figure 2:
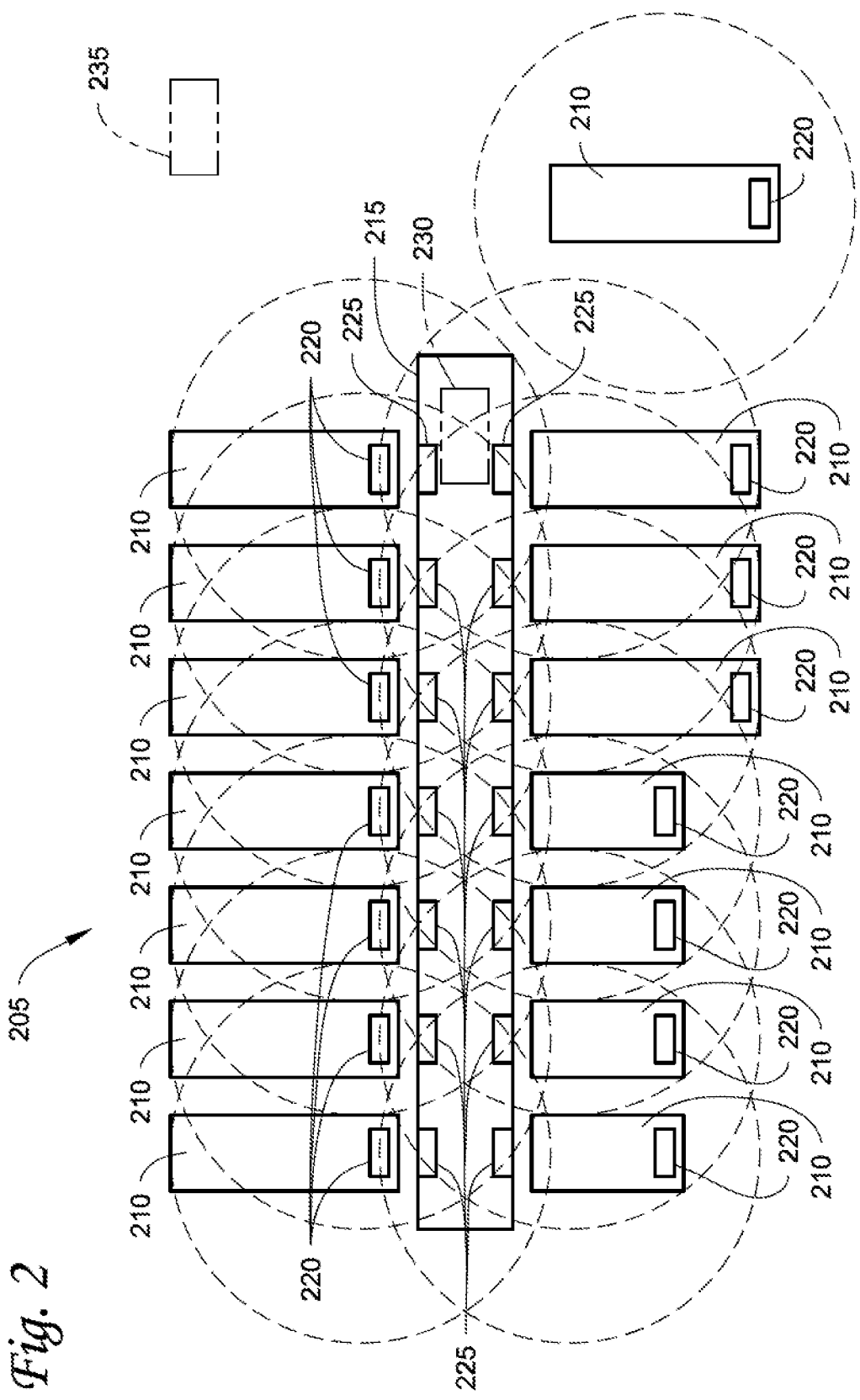
FIG. 2 illustrates a schematic view of a power distribution site temporarily housing a plurality of CCUs at a power distribution terminal, according to one embodiment.

FIG. 2 illustrates a schematic view of a power distribution site 205 temporarily housing a plurality of CCUs 210 at a power distribution terminal 215, according to one embodiment.

Generally, the power distribution site 205 can be any location where two or more CCUs 210 are temporarily housed. The power distribution site 205 can be, for example, a distribution center, a shipyard, a warehouse, a supply yard, a farm, a manufacturing/production facility, a retail store, etc.

The power distribution terminal 215 includes a plurality of electric vehicle charging stations 225. Each of the stations 225 can provide power from one or more power sources (e.g., a utility power source, a solar power source, a generator set, etc.) for powering one or more of the CCUs 210. It will be appreciated that the cost for powering one or more of the transport climate control units 210 using the one or more power sources can vary based on the time of day that the power is drawn. For example, when the power source is a utility power the utility power can be cheaper at night than during the day. There can also be periods of time during the day that the power demand from a utility power source can be greater than at other periods of time during the day. At these peak power demand times, the cost of the utility power can be higher than at other time periods of the day.

Each of the plurality of CCUs 210 is generally located in close proximity relative to at least one other transport climate control unit at the power distribution site 205. Each of the plurality of CCUs 210 can generally remain stationary at their respective location when housed at the power distribution site 205. In some embodiments, each of the CCUs 210 can be, for example, one of the CCUs 115, 133, 152, 166, 170 shown in FIGS. 1A-E. Also, each of the CCUs 210 is part of a transport climate control system (e.g., the transport climate control systems 110, 132, 145, 162, 187 shown in FIGS. 1A-E) that includes a controller 220. Each controller 220 can include a telematics unit (not shown) that is configured to communicate with one or more remote devices such as, for example, one or more of the other controllers 220 of the other CCUs 210.

In some embodiments, the telematics unit includes a wireless communicator that can communicate with one or more remote devices (e.g., a wireless communicator of another CCU 210) using, for example, a short distance wireless communication protocol such as, for example, Bluetooth Low Energy (BLE) communications. It should be noted that although peer to peer networking and BLE communications are specifically mentioned herein, other types of wireless communications can be used (e.g., ZigBee, infrared, a radio enabled protocol, a power line communication protocol, a Wi-Fi protocol, etc.). In some embodiments, the telematics unit can communicate with one or more remote devices using, for example, a long distance wireless communication protocol such as, for example, a cellular communication protocol, etc.

As shown by the circles in FIG. 2, each of the wireless communicators of the controllers 220 has a radius in which the wireless communicator can establish short distance wireless communication with a remote device. As defined herein, a CCU 210 is in close proximity with a remote device when the wireless communicator of the CCU 210 can establish short distance wireless communication with the remote device. When multiple CCUs 210 establish a short distance wireless communication link with each other, they can generate a network that can provide demand-side power distribution management for the plurality of CCUs 210. Also, while the embodiments described above reference the wireless communicator being part of a telematics unit that is part of the controller 220, it will be appreciated that in other embodiments the wireless communicator can be separate and distinct from the controller 220.

In some embodiments, one or more of the wireless communicators can communicate with an optional operation site control center 230 and/or an optional remote control center 235. The optional control center 230 is located at the power distribution terminal 215 and can communicate with one or more of the wireless communicators. In some embodiments, the optional control center 230 can be located at the power distribution site 205 but be separate from the power distribution terminal 215. The optional remote control center 235 is located away from the power distribution site 205 and can communicate with one or more of the controllers 220. In some embodiments, the optional control center 230 and/or the optional remote control center 235 can provide only a limited amount of information to the CCUs 210 (particularly power limits of the power distribution terminal 215 and/or a peak demand charge threshold).

As discussed in more detail below, the wireless communicator of one of the CCUs 210 can negotiate priority with one or more other CCUs 210 at the power distribution site 205 to receive power at the same power distribution site to manage power distribution from the power source(s) at the power distribution site. In some embodiments, the CCUs 210 can manage power distribution with limited input (e.g., distribution site power limits, peak demand charge threshold, etc.) from the supply side (e.g., the power distribution site). Peak demand as defined herein can refer to the highest average time period (e.g., 15 minute period) of power over a given month. The CCUs 210 can demand power from the power distribution site 205 in order to operate while at the power distribution site 205 and/or to charge a rechargeable energy storage for later use by the CCU 210, for example, while in transit. The CCUs 210 can demand power from the power distribution site 205 in order to operate while at the power distribution site 205 and/or to charge a rechargeable energy storage for later use by the CCU 210, for example, while in transit.

In some embodiments, one CCU 210 can determine whether other CCUs 210 are at the same power distribution site 205, can monitor operation modes of the other CCUs 210, and can determine when to demand power from the power distribution site 205 based on this information. Accordingly, the CCUs 210 can coordinate their starting, running, and charging to manage power supplied by the power distribution site using peer-peer communication.

Figure 3:
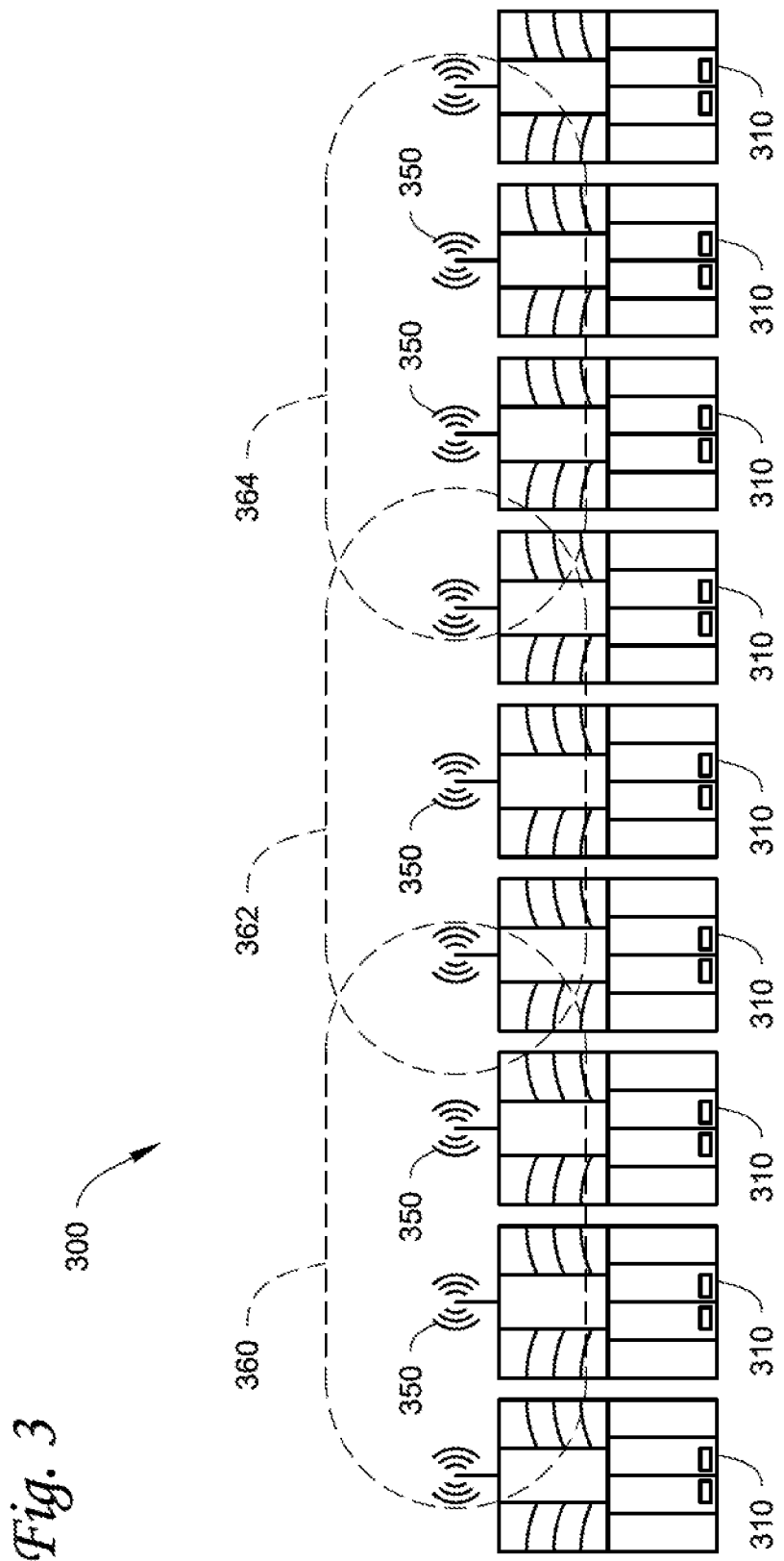
FIG. 3 illustrates a schematic diagram of a network of multiple CCUs receiving power at a power same distribution site, according to one embodiment.

FIG. 3 illustrates a schematic diagram of a network 300 of multiple CCUs 310 receiving power at a power same distribution site (e.g., the power distribution site 205 shown in FIG. 2), according to one embodiment. Although there are nine CCUs 310 shown in the example of FIG. 3, it will be appreciated that the network 300 can include more or less CCUs 310. In some examples, the CCUs 310 of network 300 are all located at a single power distribution site.

An overview of the network 300 for demand-side power demand management is provided, according to one embodiment. Network 300 is merely exemplary and is not limited to the embodiment presented herein. Network 300 can be employed in many different embodiments or examples not specifically depicted or described herein. In some embodiments, the network 300 can be a hybrid network in which some CCUs 310 are allowed to network with each other, but other CCUs 310 are operated without using the embodiments described herein.

As shown in FIG. 3, each of the CCUs 310 can comprise a wireless communicator 350. In some embodiments, the wireless communicator can comprise wireless short distance peer to peer communication. In the same or other embodiments, the wireless communicator can comprise Bluetooth Low Energy (BLE) communications. It should be noted that although peer to peer networking and BLE communications are specifically mentioned herein, other types of wireless communications can be used (e.g., ZigBee, infrared, a radio enabled protocol, a power line communication protocol, a Wi-Fi protocol, etc.).

In network 300, the wireless communicators 350 of the CCUs 310 communicate with each other. CCUs 310 that are within communication range from each other form a localized network 360. In some embodiments, the limited range of the wireless communicators 350 limit the range of the localized network 360. As such, more than one network, such as for example, 362 and 364 will also be created. In such an example, a CCU 310 with wireless communicator 350 in localized network 360 may be able to reach another CCU 310 with a wireless communicator 350 that is in localized network 362. In such an example, information/data may be passed from localized network 360 to 362. Therefore, even though all CCUs 310 with wireless communicators 350 in localized network 360 may not have the range to reach all the communications systems 350 of localized network 362, all CCUs 310 in localized networks 360 and 362 may receive the same data as each other due to one or more CCUs 310 being within range of both localized networks 360 and 362.

Similarly, a CCU 310 with wireless communicator 350 in localized network 362 may be able to reach another CCU 310 with wireless communicator 350 that is in localized network 364. In such an example, information/data may be passed from localized network 362 to 364. Therefore, even though all CCUs 310 with wireless communicators 350 in localized network 362 may not have the range to reach all the communications systems 350 of localized network 364, all CCUs 310 in localized networks 362 and 364 may receive the same data as each other due to one or more CCUs 310 being within range of both localized networks 362 and 364.

Furthermore, since localized networks 360 and 362 may have the same data, and localized networks 362 and 364 may have the same data, localized networks 360 and 364 may have the same data, even though the range of any single communications system 350 of any CCU 310 in localized network 360 cannot reach that of any single wireless communicator 350 of any CCU 310 in localized network 364. It should also be noted, that although FIG. 3 shows that there are three separate localized networks (360, 362, and 364), there may be more or less networks present.

FIG. 4 illustrates a flowchart of a method 400 for demand-side power distribution management amongst multiple electrically powered accessories (e.g., the CCUs 310 shown in FIG. 3) at a power distribution site (e.g., the power distribution terminal 205 shown in FIG. 2), according to one embodiment.

The method 400 begins at 405 whereby a controller of an electrically powered accessory waits until it senses that the electrically powered accessory is plugged into an electric vehicle charging station at the power distribution site. The method 400 then proceeds to 410.

At 410, the electrically powered accessory detects adjacent peer(s) (i.e., other electrically powered accessories) in the vicinity. It will be appreciated that the other electrically powered accessories can also stationed at the power distribution site and one or more can be connected to different EV charging stations provided at the power distribution site. In some embodiments, a wireless communicator (e.g., the wireless communicator 350 shown in FIG. 3) of the electrically powered accessory can determine that there are peer(s) in the vicinity when it detects one or more peer(s) within short distance wireless communication range of the electrically powered accessory. In some embodiments, the wireless communicator can use BLE communications to detect adjacent peer(s) within short distance wireless communication range of the electrically powered accessory. If the controller determines that one or more peers are detected, the method 400 proceeds to 420. If the controller of the electrically powered accessory determines that no peers are detected, the method 400 proceeds to 465.

At 420, the wireless communicator establishes a peer-peer communication link with one or more peers (e.g., other electrically powered accessories). In some embodiments, the electrically powered accessory can use an inherent wireless range of the wireless communicator of the electrically powered accessory and/or geo-location data to self-establish a peer-peer network. The method 400 then proceeds to 425.

At 425, the electrically powered accessory operates in an initial connection mode. In some embodiments, when the electrically powered accessory is a CCU, the initial connection mode can be a run/charge mode whereby the CCU is operated to run the compressor and other components of the CCU to provide climate control to a climate controlled space of a transport unit without charging a rechargeable energy storage of the CCU. Once the components, including the compressor, of the CCU are no longer needed to provide climate control, power is re-directed to the rechargeable energy storage for charging. In some embodiments, when the electrically powered accessory is a CCU, the initial connection mode can be a continuous mode whereby the CCU is continuously running to provide climate control to the climate controlled space while any excess energy is provided for simultaneously charging the rechargeable energy storage of the CCU. The method 400 then proceeds to 430.

At 430, the controller of the electrically powered accessory determines power needs of the electrically powered accessory. The power needs can include, for example, a run power amount that provides the amount of power needed to currently operate the electrically powered accessory while stationed at a power distribution site (e.g., the power distribution site 205 shown in FIG. 2) and/or a charge power amount that provides the amount of power needed for storage within a rechargeable energy storage to provide sufficient power for operating the electrically powered accessory during an upcoming trip.

For example, when the electrically powered accessory is a CCU, the controller can determine a run power amount that provides the amount of power needed to provide climate control within the climate controlled space while stationed at the power distribution site and/or a charge power amount that provides the amount of power needed to charge the rechargeable energy storage with sufficient power for the CCU to provide climate control within the climate controlled space during a duration of an upcoming trip. In these embodiments, the controller can determine run power amount and the charge power amount based on a variety of parameters including, for example, temperature and pressure measurements at various locations of the climate controlled circuit, the cargo stored in the climate controlled space, the desired temperature within the climate controlled space, the current temperature within the climate controlled space, the ambient temperature, the ambient humidity, the altitude that the CCU will be traveling at during the upcoming trip, the route of the upcoming trip, the estimated duration of the upcoming trip, the estimated duration that the CCU will be at the power distribution site, regulations that can impact operation of the CCU during the upcoming trip, desired operation modes of the CCU (e.g., run modes such as start-stop, continuous, pull-down during pre-conditioning,), etc. In some embodiments, temperature and pressure measurements at various locations of the climate controlled circuit can be used to calculate instantaneous power and total power for the transport climate control system. The instantaneous power and the total power can be logged under specific conditions (e.g., ambient temperature, cargo temperature, return air temperature, etc.) and used to predict future operation power requirements of the transport climate control system under similar conditions. In some embodiments, when there is a variable cargo (e.g., people in a transit application), sensors can be used to detect variable mass temperature and/or total volume of mass in the climate controlled space. The variable mass temperature and/or total volume of mass in the climate controlled space can be used to determine power needs of the electrically powered accessory. As an example, when the CCU is for a passenger bus, the CCU may desire pre-conditioning demands prior to leaving the power distribution site to quickly provide desired climate controlled conditions within the passenger compartment followed by a maintenance demand to maintain climate control (e.g., temperature) within the passenger compartment until the passenger bus is dispatched from the power distribution site. The method 400 then proceeds to 435.

At 435, the controller generates a pending power request based on the run power amount and/or the charge power amount. When the electrically powered accessory is a CCU, the pending power request can include a dispatch time for when the CCU is scheduled to leave the power distribution site, criticality of cargo being conditioned by the CCU, a desired setpoint temperature for a climate controlled space being conditioned by the CCU, whether the CCU is providing climate control to fresh temperature cargo (e.g., fruit, vegetables, flowers, etc.) or frozen temperature cargo (e.g., pharmaceuticals, meat, seafood, frozen foods, etc.), a specific operational profiles for the CCU, etc. In some embodiments, the pending power request can be tuned/calibrated based on historical data of the transport unit to provide a more accurate prediction of actual power required in similar or modeled conditions. The method 400 then proceeds to 440.

At 440, a wireless communicator of the electrically powered accessory communicates the pending power request to a one or more communication networks (e.g., the localized networks 360, 362, 364 shown in FIG. 3) that are in range using the peer-peer communication link established at 420. The method 400 then proceeds to 445.

At 445, the wireless communicator also monitors for pending power requests from other peers (i.e., wireless communicator(s) of other electrically powered accessories) within the one or more communication networks. If the wireless communicator determines that one or more pending power requests is obtained, the method 400 proceeds to 450. If the wireless communicator determines no other pending power requests are obtained, the method 400 proceeds to 465.

At 450, a power request queue of the pending power requests (including the pending power request generated at 435) is generated to determine an order for the electrically powered accessories with a pending power request. The power request queue can indicate which of the electrically powered accessories are in line to demand power at the EV charging station and which electrically powered accessories are requested to wait. In some embodiments, each of the electrically powered accessories can generate the power request queue based on time stamps of when each of the pending power requests is communicated.

In some embodiments, an operation site control center (e.g., optional operation site control center 230 shown in FIG. 2) and/or a remote control center (e.g., optional remote control center 235 shown in FIG. 2) can generate the power request queue based on information received from the electrically powered accessories via, for example, a wireless communication interface (e.g., one or more of ZigBee, infrared, a radio enabled protocol, a power line communication protocol, a Wi-Fi protocol, etc.). In some embodiments, the control center can use a dispatch schedule system to generate the power request queue. When the electrically powered accessories are CCUs, the operation site and/or remote control center can generate the power request queue based on, for example, a demand start and/or operational requests from each of the CCUs. For example, the power request queue can be determined based on, for example, dispatch times for when the CCUs are scheduled to leave the power distribution site, criticality of cargo being conditioned by each of the CCUs, desired setpoint temperatures of the climate controlled spaces/cargo being conditioned by each of the CCUs, zone operation of CCUs operating in a multi-zone transport climate control system, whether each of the CCUs are providing climate control to fresh temperature cargo or frozen temperature cargo, specific operational profiles for each of the CCUs (e.g., run modes such as start-stop, continuous, pull-down during pre-conditioning, etc.). In some embodiments, the control center can actively update prioritization of the power request queue based on, for example, a position change of the electrically powered accessory at the power distribution site. For example, the control center can actively update prioritization of the power request queue when a transport unit with a CCU is moved from a loading area to a staging area, thereby triggering a change in the predicted power use. In another example, the control center can actively update prioritization of the power request queue when a mass-transit bus changes routes. The method 400 then proceeds to 455.

At 455, the controller of the electrically powered accessory determines whether it is position in the power request queue to demand power at the EV charging station where it is stationed. If the controller determines that it is not in position in the power request queue to demand power, the method 400 proceeds to 460. If the controller determines that it is position in the power request queue to demand power, the method 400 proceeds to 465.

At 460, the electrically powered accessory waits for the power request queue to clear until it is in position to demand power from the EV charging station where it is stationed. It will be appreciated that while the electrically powered accessory is waiting in the power request queue, the controller of the electrically powered accessory can instruct the electrically powered accessory to operate in a low power consumption mode or operate in an operational null state in order to prevent/conserve energy usage during the wait. When the electrically powered accessory determines that is in position in the power request queue to demand power, the method 400 proceeds to 465.

At 465, the controller instructs the electrically powered accessory to demand power from the EV charging station where it is stationed to satisfy the power needs of the electrically powered accessory. In some embodiments, the electrically powered accessory can request power from the EV charging station to operate the electrically powered accessory while the electrically powered accessory is stationed at the power distribution site. In some embodiments, the electrically powered accessory can request power from the EV charging station to charge a rechargeable energy storage of the electrically powered accessory. The method 400 then proceeds to 470.

At 470, the controller monitors the power received by the EV charging station to determine when the power needs of the electrically powered accessory are satisfied. In embodiments where the electrically powered accessory is a CCU, the controller can monitor the power received by the EV charging station and determine that the power needs are satisfied when, for example, a desired setpoint temperature for a climate controlled spaced conditioned by the CCU has been reached, when a rechargeable energy storage of the electrically powered accessory has reached a threshold charge level, etc. Once the controller determines that the power needs of the electrically powered accessory are satisfied, the method 400 proceeds to 475.

At 475, the wireless communicator clears the electrically powered accessory from the power request queue. In some embodiments, the controller can also instruct the electrically powered accessory to enter an operational null state to prevent/conserve energy usage. The method 400 then ends.

Aspects:

Any of aspects 1-7 can be combined with any of aspects 8-15, 16-22 and 23-29. Any one of aspects 8-15 can be combined with any of aspects 16-22 and 23-29. Also, any of aspects 16-22 can be combined with any one of aspects 23-29.

Aspect 1. A method of power demand management, the method comprising:

an electrically powered accessory configured to be used with at least one of a vehicle, a trailer, and a transportation container sensing that it has connected to a power source;

the electrically powered accessory detecting one or more additional electrically powered accessories in a vicinity of the electrically powered accessory;

the electrically powered accessory establishing a communication link with the one or more additional electrically powered accessories;

the electrically powered accessory generating a pending power request to demand power from the power source to the electrically powered accessory when the electrically powered accessory detects one or more additional electrically powered accessories in the vicinity of the electrically powered accessory;

the electrically powered accessory transmitting the pending power request to the one or more additional electrically powered accessories;

the electrically powered accessory monitoring for one or more additional pending power requests from the one or more additional electrically powered accessories;

the electrically powered accessory monitoring its position within a power request queue for obtaining power from the power source amongst the electrically powered accessory and the one or more additional electrically powered accessories; and the electrically powered accessory demanding power from the power source when its position within the power request queue is high enough to demand power from the power source.

Aspect 2. The method of aspect 1, wherein the electrically powered accessory detecting one or more additional electrically powered accessories in the vicinity includes the electrically powered accessory detecting one or more additional electrically powered accessories within a short distance wireless communication range of the electrically powered accessory.

Aspect 3. The method of any one of aspects 1-2, wherein the electrically powered accessory establishing the communication link with the one or more additional electrically powered accessories includes the electrically powered accessory establishing a Bluetooth low energy communication link with the one or more additional electrically powered accessories.

Aspect 4. The method of any one of aspects 1-3, wherein the electrically powered accessory generating the pending power request includes determining a run power amount, that is an amount of power needed to currently operate the electrically powered accessory, and determining a charge power amount, that is an amount of power needed for storage within a rechargeable energy storage of the electrically powered accessory to provide sufficient power for operating the electrically powered accessory.

Aspect 5. The method of any one of aspects 1-4, further comprising the electrically powered accessory waiting to demand power from the power source when its position within the power request queue is not high enough to demand power from the power source.

Aspect 6. The method of aspect 5, further comprising the electrically powered accessory operating in a low power consumption mode or in an operational null state in order to prevent and/or conserve energy usage while the electrically powered accessory is waiting to demand power from the power source.

Aspect 7. The method of any one of aspects 1-6, further comprising the electrically powered accessory removing the pending power request from the power request queue when a controller of the electrically powered accessory determines that power needs in the pending power request are satisfied.

Aspect 8. An electrically powered accessory comprising:

a controller that controls operation of the electrically powered accessory and senses when the electrically powered accessory is connected to a power source;

a wireless communicator that includes short distance wireless peer to peer communication for short distance peer to peer communication, wherein the wireless communicator is configured to detect one or more additional electrically powered accessories in a vicinity of the electrically powered accessory and is configured to establish a communication link with the one or more additional electrically powered accessories; and a rechargeable energy storage configured to be charged by a power source and provides energy to the electrically powered accessory while in transit;

wherein the electrically powered accessory is configured to be used with at least one of a vehicle, a trailer, and a transportation container, wherein the controller is configured to generate a pending power request to demand power from the power source to the electrically powered accessory when the wireless communicator detects the one or more additional electrically powered accessories in the vicinity of the electrically powered accessory, wherein the wireless communicator is configured to transmit the pending power request to the one or more additional electrically powered accessories, wherein the wireless communicator is configured to monitor for one or more additional pending power requests from the one or more additional electrically powered accessories, and wherein the controller is configured to monitor a position of the electrically powered accessory within a power request queue for obtaining power from the power source amongst the electrically powered accessory and the one or more additional electrically powered accessories and is configured to demand power from the power source when the position of the electrically powered accessory within the power request queue is high enough to demand power from the power source.

Aspect 9. The electrically powered accessory of aspect 8, wherein the wireless communicator is configured to detect the one or more additional electrically powered accessories in the vicinity when the wireless communicator detects the one or more additional electrically powered accessories are within a short distance wireless communication range of the electrically powered accessory.

Aspect 10. The electrically powered accessory of any one of aspects 8-9, wherein the wireless communicator is configured to establish the communication link with the one or more additional electrically powered accessories using a Bluetooth low energy communication protocol.

Aspect 11. The electrically powered accessory of any one of aspects 8-10, wherein the controller is configured to generate the pending power request by determining a run power amount, that is an amount of power needed to currently operate the electrically powered accessory, and determining a charge power amount, that is an amount of power needed for storage within a rechargeable energy storage of the electrically powered accessory to provide sufficient power for operating the electrically powered accessory.

Aspect 12. The electrically powered accessory of any one of aspects 8-11, wherein the controller is configured to wait to demand power from the power source when the position of the electrically powered accessory within the power request queue is not high enough to demand power from the power source.

Aspect 13. The electrically powered accessory of aspect 12, wherein the controller is configured instruct the electrically powered accessory to operate in a low power consumption mode or in an operational null state in order to prevent and/or conserve energy usage while the electrically powered accessory is waiting to demand power from the power source.

Aspect 14. The electrically powered accessory of any one of aspects 8-13, wherein the wireless communicator is configured to remove the pending power request from the power request queue when the controller determines that power needs in the pending power request are satisfied.

Aspect 15. The electrically powered accessory of any one of aspects 8-14, further comprising a climate control circuit to provide climate control within a climate controlled space while in transit.

Aspect 16. A method of power demand management, the method comprising:

an electrically powered climate control unit (CCU) configured to be used with at least one of a vehicle, a trailer, and a transportation container sensing that it has connected to a power source;

the electrically powered CCU detecting one or more additional electrically powered CCUs in a vicinity of the electrically powered CCU;

the electrically powered CCU establishing a communication link with the one or more additional electrically powered CCUs;

the electrically CCU generating a pending power request to demand power from the power source to the electrically powered CCU when the electrically powered CCU detects one or more additional electrically powered CCUs in the vicinity of the electrically powered CCU;

the electrically powered CCU transmitting the pending power request to the one or more additional electrically powered CCUs;

the electrically powered CCU monitoring for one or more additional pending power requests from the one or more additional electrically powered CCUs;

the electrically powered CCU monitoring its position within a power request queue for obtaining power from the power source amongst the electrically powered CCU and the one or more additional electrically powered CCUs; and the electrically powered CCU demanding power from the power source when its position within the power request queue is high enough to demand power from the power source.

Aspect 17. The method of claim 16, wherein the electrically powered CCU detecting one or more additional electrically powered CCUs in the vicinity includes the electrically powered CCU detecting one or more additional electrically powered CCUs within a short distance wireless communication range of the electrically powered CCU.

Aspect 18. The method of any one of aspects 16 and 17, wherein the electrically powered CCU establishing the communication link with the one or more additional electrically powered CCUs includes the electrically powered CCU establishing a Bluetooth low energy communication link with the one or more additional electrically powered CCUs.

Aspect 19. The method of any one of aspects 16-18, wherein the electrically powered CCU generating the pending power request includes determining a run power amount, that is an amount of power needed to currently operate the electrically powered CCU, and determining a charge power amount, that is an amount of power needed for storage within a rechargeable energy storage of the electrically powered CCU to provide sufficient power for operating the electrically powered CCU.

Aspect 20. The method of any one of aspects 16-19, further comprising the electrically powered CCU waiting to demand power from the power source when its position within the power request queue is not high enough to demand power from the power source.

Aspect 21. The method of aspect 20, further comprising the electrically powered CCU operating in a low power consumption mode or in an operational null state in order to prevent and/or conserve energy usage while the electrically powered CCU is waiting to demand power from the power source.

Aspect 22. The method of any one of aspects 16-121, further comprising the electrically powered CCU removing the pending power request from the power request queue when a controller of the CCU determines that power needs in the pending power request are satisfied.

Aspect 23. An electrically powered climate control unit (CCU) comprising:

a climate control circuit configured to provide climate control within a climate controlled space while in transit;

a controller that controls operation of the electrically powered CCU and senses when the electrically powered CCU is connected to a power source;

a wireless communicator that includes short distance wireless peer to peer communication for short distance peer to peer communication, wherein the wireless communicator is configured to detect one or more additional electrically powered CCUs in a vicinity of the electrically powered CCU and is configured to establish a communication link with the one or more additional electrically powered CCUs; and a rechargeable energy storage configured to be charged by a power source and provides energy to the electrically powered CCU while in transit;

wherein the electrically powered CCU is configured to be used with at least one of a vehicle, a trailer, and a transportation container, wherein the controller is configured to generate a pending power request to demand power from the power source to the electrically powered CCU when wireless communicator detects the one or more additional electrically powered CCUs in the vicinity of the electrically powered CCU, wherein the wireless communicator is configured to transmit the pending power request to the one or more additional electrically powered CCUs, wherein the wireless communicator is configured to monitor for one or more additional pending power requests from the one or more additional electrically powered CCUs, and wherein the controller is configured to monitor a position of the electrically powered CCU within a power request queue for obtaining power from the power source amongst the electrically powered CCU and the one or more additional electrically powered CCUs and is configured to demand power from the power source when the position of the electrically powered CCU within the power request queue is high enough to demand power from the power source.

Aspect 24. The electrically powered CCU of aspect 23, wherein the wireless communicator is configured to detect the one or more additional electrically powered CCUs in the vicinity when the wireless communicator detects the one or more additional electrically powered CCUs are within a short distance wireless communication range of the electrically powered CCU.

Aspect 25. The electrically powered CCU of any one of aspects 23 and 24, wherein the wireless communicator is configured to establish the communication link with the one or more additional electrically powered CCUs using a Bluetooth low energy communication protocol.

Aspect 26. The electrically powered CCU of any one of aspects 23-25, wherein the controller is configured to generate the pending power request by determining a run power amount, that is an amount of power needed to currently operate the electrically powered CCU, and determining a charge power amount, that is an amount of power needed for storage within a rechargeable energy storage of the electrically powered CCU to provide sufficient power for operating the electrically powered CCU.

Aspect 27. The electrically powered CCU of any one of aspects 23-26, wherein the controller is configured to wait to demand power from the power source when the position of the electrically powered CCU within the power request queue is not high enough to demand power from the power source.

Aspect 28. The electrically powered CCU of aspect 27, wherein the controller is configured instruct the electrically powered CCU to operate in a low power consumption mode or in an operational null state in order to prevent and/or conserve energy usage while the electrically powered CCU is waiting to demand power from the power source.

Aspect 29. The electrically powered CCU of any one of aspects 23-28, wherein the wireless communicator is configured to remove the pending power request from the power request queue when the controller determines that power needs in the pending power request are satisfied.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A method of power demand management, the method comprising:
    an electrically powered transport refrigeration unit (TRU) sensing that the electrically powered TRU has connected to a power source, wherein the electrically powered TRU is configured to be used with at least one of a vehicle, a trailer, and a transportation container;
    the electrically powered TRU detecting one or more additional electrically powered TRUs in a vicinity of the electrically powered TRU;
    the electrically powered TRU establishing a communication link with the one or more additional electrically powered TRUs;
    the electrically powered TRU generating a pending power request to demand power from the power source to the electrically powered TRU when the electrically powered TRU detects one or more additional electrically powered TRUs in the vicinity of the electrically powered TRU;
    the electrically powered TRU transmitting the pending power request to the one or more additional electrically powered TRUs;
    the electrically powered TRU monitoring for one or more additional pending power requests from the one or more additional electrically powered TRUs;
    the electrically powered TRU monitoring a position of the electrically powered TRU within a power request queue for obtaining power from the power source amongst the electrically powered TRU and the one or more additional electrically powered TRUs; and
    the electrically powered TRU demanding power from the power source when the position of the electrically powered TRU within the power request queue is high enough to demand power from the power source,
    wherein the electrically powered TRU detecting the one or more additional electrically powered TRUs in the vicinity includes the electrically powered TRU detecting one or more additional electrically powered TRUs within a short distance wireless communication range of the electrically powered TRU.

2. The method of claim 1, wherein the electrically powered TRU establishing the communication link with the one or more additional electrically powered TRUs includes the electrically powered TRU establishing a Bluetooth low energy communication link with the one or more additional electrically powered TRUs.

3. The method of claim 1, wherein the electrically powered TRU generating the pending power request includes determining a run power amount, that is an amount of power needed to currently operate the electrically powered TRU, and determining a charge power amount, that is an amount of power needed for storage within a rechargeable energy storage of the electrically powered TRU to provide sufficient power for operating the electrically powered TRU.

4. The method of claim 1, further comprising the electrically powered TRU waiting to demand power from the power source when the position of the electrically powered TRU within the power request queue is not high enough to demand power from the power source.

5. The method of claim 4, further comprising the electrically powered TRU operating in a low power consumption mode or in an operational null state in order to prevent and/or conserve energy usage while the electrically powered TRU is waiting to demand power from the power source.

6. The method of claim 1, further comprising the electrically powered TRU removing the pending power request from the power request queue when a controller of the TRU determines that power needs in the pending power request are satisfied.

7. An electrically powered transport refrigeration unit comprising:
    a climate control circuit configured to provide climate control within a climate controlled space while in transit;
    a controller that controls operation of the electrically powered and senses when the electrically powered TRU is connected to a power source;
    a wireless communicator that includes short distance wireless peer to peer communication for short distance peer to peer communication, wherein the wireless communicator is configured to detect one or more additional electrically powered TRUs in a vicinity of the electrically powered TRU and is configured to establish a communication link with the one or more additional electrically powered TRUs; and
    a rechargeable energy storage configured to be charged by a power source and provides energy to the electrically powered TRU while in transit;
    wherein the electrically powered TRU is configured to be used with at least one of a vehicle, a trailer, and a transportation container,
    wherein the controller is configured to generate a pending power request to demand power from the power source to the electrically powered TRU when wireless communicator detects the one or more additional electrically powered TRUs in the vicinity of the electrically powered TRU,
    wherein the wireless communicator is configured to transmit the pending power request to the one or more additional electrically powered TRUs,
    wherein the wireless communicator is configured to monitor for one or more additional pending power requests from the one or more additional electrically powered TRUs, and
    wherein the controller is configured to monitor a position of the electrically powered TRU within a power request queue for obtaining power from the power source amongst the electrically powered TRU and the one or more additional electrically powered TRUs and is configured to demand power from the power source when the position of the electrically powered TRU within the power request queue is high enough to demand power from the power source, wherein the wireless communicator is configured to detect the one or more additional electrically powered TRUs in the vicinity when the wireless communicator detects the one or more additional electrically powered TRUs are within a short distance wireless communication range of the electrically powered TRU.

8. The electrically powered TRU of claim 7, wherein the wireless communicator is configured to establish the communication link with the one or more additional electrically powered TRUs using a Bluetooth low energy communication protocol.

9. The electrically powered TRU of claim 7, wherein the controller is configured to generate the pending power request by determining a run power amount, that is an amount of power needed to currently operate the electrically powered TRUs, and determining a charge power amount, that is an amount of power needed for storage within a rechargeable energy storage of the electrically powered TRU to provide sufficient power for operating the electrically powered TRU.

10. The electrically powered TRU of claim 7, wherein the controller is configured to wait to demand power from the power source when the position of the electrically powered TRU within the power request queue is not high enough to demand power from the power source.

11. The electrically powered TRU of claim 10, wherein the controller is configured instruct the electrically powered TRU to operate in a low power consumption mode or in an operational null state in order to prevent and/or conserve energy usage while the electrically powered TRU is waiting to demand power from the power source.

12. The electrically powered TRU of claim 7, wherein the wireless communicator is configured to remove the pending power request from the power request queue when the controller determines that power needs in the pending power request are satisfied.

* * * * *